US008000511B2

(12) United States Patent
Perz

(10) Patent No.: US 8,000,511 B2
(45) Date of Patent: Aug. 16, 2011

(54) SYSTEM FOR AND METHOD OF FOCUSING IN AUTOMATED MICROSCOPE SYSTEMS

(75) Inventor: Cynthia B. Perz, Huntington Beach, CA (US)

(73) Assignee: Carl Zeiss Microimaging GmbH, Jena (DE)

( * ) Notice: Subject to any disclaimer, the term of this patent is extended or adjusted under 35 U.S.C. 154(b) by 0 days.

(21) Appl. No.: 12/763,854

(22) Filed: Apr. 20, 2010

(65) Prior Publication Data
US 2010/0265323 A1 Oct. 21, 2010

Related U.S. Application Data

(63) Continuation of application No. 11/346,727, filed on Feb. 2, 2006, now abandoned.

(60) Provisional application No. 60/705,065, filed on Aug. 2, 2005.

(51) Int. Cl.
G06K 9/00 (2006.01)

(52) U.S. Cl. ...... 382/128; 382/133; 382/255; 250/201.2; 250/201.3; 250/201.4; 250/201.7; 359/383

(58) Field of Classification Search .................. 382/128, 382/133, 255; 250/201.2, 201.3, 201.4, 201.7; 359/383
See application file for complete search history.

(56) References Cited

U.S. PATENT DOCUMENTS

| | | | | |
|---|---|---|---|---|
| 5,647,025 A * | 7/1997 | Frost et al. | .................... | 382/255 |
| 5,932,872 A * | 8/1999 | Price | .......................... | 250/201.3 |
| 6,262,838 B1 | 7/2001 | Montagu | | |
| 6,518,554 B1 | 2/2003 | Zhang | | |
| 6,548,795 B1 * | 4/2003 | Atkinson et al. | ........... | 250/201.2 |
| 2004/0004614 A1 | 1/2004 | Bacus et al. | | |
| 2004/0113059 A1* | 6/2004 | Kawano et al. | ............... | 250/234 |
| 2004/0202357 A1 | 10/2004 | Perz et al. | | |
| 2004/0217257 A1* | 11/2004 | Fiete et al. | ................. | 250/201.7 |
| 2007/0031056 A1 | 2/2007 | Perz | | |

FOREIGN PATENT DOCUMENTS

| | | |
|---|---|---|
| WO | WO 96/01438 | 1/1996 |
| WO | WO 97/04348 | 2/1997 |

OTHER PUBLICATIONS

IEEXPlore# Website Search History Page, dated Nov. 18, 2009, 1 Pg.
PAIR File History for U.S. Appl. No. 11/346,727, filed Feb. 2, 2006, and published Feb. 8, 2007, as Publication No. 2007/0031056.

* cited by examiner

Primary Examiner — Vikkram Bali
Assistant Examiner — Julian Brooks
(74) Attorney, Agent, or Firm — Patterson, Thuente Christensen Pedersen, P.A.

(57) ABSTRACT

The present disclosure includes systems and techniques relating to focusing in automated microscope systems. In general, in one implementation, the technique includes obtaining an image of at least a portion of a scan region, analyzing the image to find an area in the image representing a sample, determining a nature of the sample at a selected focus point location in the area in the image, selecting an automated focusing process for use at the selected focus point location based on the determined nature of the sample at the selected focus point location, and focusing the selected automated focusing process. The selecting can include selecting different automated focusing processes for different focus point locations based on different tissue characteristics at the locations.

21 Claims, 5 Drawing Sheets

SYSTEM FOR AND METHOD OF FOCUSING IN AUTOMATED MICROSCOPE SYSTEMS

CROSS REFERENCE TO RELATED APPLICATIONS

This application is a continuation of U.S. application Ser. No. 11/346,727, filed Feb. 2, 2006, and entitled SYSTEM FOR AND METHOD OF FOCUSING IN AUTOMATED MICROSCOPE SYSTEMS, which application claims the benefit of the priority of U.S. Provisional Application Ser. No. 60/705,065, filed Aug. 2, 2005 and entitled, System for and Method of Focusing in Automated Microscope Systems, said applications being hereby fully incorporated herein by reference.

TECHNICAL FIELD

The present application relates to focusing on an object viewed through a computer-controlled automated microscope to generate digital images, such as when using a computer-controlled automated microscope in an analysis of biological specimens.

BACKGROUND

The microscopic examination of tissue or tissue components is a common and valuable practice in both medicine and biology. Such procedures typically rely on the visual appearance of the tissue, which is often enhanced by the use of specialized stains that bind to certain tissue components, foreign bodies, or the products of cellular processes.

With the advent of computer technology, it has now become possible to automate many of the manual examination procedures by digitizing the images and placing them into the memory of a computer for analysis, display, and storage. However, the success of known automated imaging systems generally depends on the ability of the system to focus its optics on the tissue components of interest without operator intervention.

To obtain a focused image of a sample, microscopes have a stage for moving the objective or sample along the Z axis, thereby moving the focal plane of the objective towards or away from the sample; generally, either the objective or sample is in a fixed position and the other is moved along the Z axis. The Z axis is the axis perpendicular to a two-dimensional X,Y plane. Thus, where a sample is in an X,Y plane, such as on a generally planar slide, the Z axis is perpendicular to the slide extending from above and below the slide. A Z position is a position along the Z axis (e.g., position of focal plane, best focus, objective, stage, sample, or slide). There exists a focal plane located at a Z position which provides optimal focus of an image of the sample or portion thereof.

In order to assess the focus quality of a particular image, an image processor is typically used. The image processor quantifies the focusness of an image, so that an image with a peak of focus power can be identified. When an objective travels along the Z axis, a series of images are acquired. A focus power is calculated for each image acquired. Prior research and development has refined methods for calculating image focus power.

U.S. Patent Application No. 2004-0004614, entitled, Focusable Virtual Microscopy Apparatus and Method, describes a virtual microscope slide that includes images of a specimen for a given level of optical magnification, which are associated and stored in a data structure. The forming of the data structure that has the multiple Z axis images preferably includes automatically focusing at a principal reference focal plane and capturing and digitizing an optically magnified reference image and then shifting the specimen relative to the lens system by a predetermined increment to capture and digitize another Z axis image. Preferably, a multiple sequence of Z axis images above and below the reference image are captured and digitized.

While the '614 patent application provides a means of focusing on a particular X,Y coordinate, the '614 patent application may not provide an optimal focal plane. Rather, it builds a stack of images with focal planes at various Z axis locations, which allows the user to view each one. For an automated microscope imaging system, this utilizes considerable storage and processing resources and may not improve the speed at which the user can view images of magnified samples.

Patent Publication No. WO9704348A1, entitled, Automatic Focus System, describes an automated focus system formed by an intelligent, controlled electro-mechanical actuation system for maneuvering a microscope lens. The focus system brings a stained biological material into optimal focus for image acquisition. The automated focus system is operable without human intervention and utilizes a merit function based on the "texture" of a dark stained biological material in the field of view of the microscope objective. The system utilizes a maximization procedure that uses a feedback technique related to the merit function in order to control the position of the objective lens. The merit function, in turn, is based on a series of calculations performed on a set of digitized images captured at different focal positions. The use of an intelligent control routine to issue instructions to the motion control system allows the device to avoid the usual focus and pitfalls associated with microscopic image capture. The '348 patent publication describes a method, utilizing a Laplacian operator, to determine the focusness of a digital image taken of a sample with the focal plane at a particular location along the Z axis.

Once an image processor, using a focus algorithm, has quantified the focusness for several images taken at a particular X,Y location from several Z positions, the system then determines which image is most in focus. Current methods assume that the Z position with the greatest score is the image that is most in focus. However, if the system has focused on dust located on top of the cover slip, or if the specimen is translucent, there may be multiple peaks or no clear peak at all.

Once a current automated imaging system has determined optimal Z positions for each X,Y location, it fits a focal plane or surface to the resulting {X,Y,Z} coordinates. However, if the system focused on something other than the specimen at one or at a number of the focus points, the resulting focal plane may be significantly skewed towards these faulty points.

SUMMARY

The present disclosure includes systems and techniques relating to focusing in automated microscope systems. Implementations of the systems and techniques described here may occur in hardware, firmware, software or combinations thereof, and may include computer program instructions for causing a programmable machine to perform the operations described.

According to some implementations, an automated focusing system can adjust the positioning of magnifying optics utilized for microscopic examination of tissue or tissue components in medical and biological-applications. An automated imaging system can include a microscope, a controller coupled with the microscope, and a display device coupled with the controller. The microscope can be a computer-controlled microscope electrically connected to the controller and including a barcode reader, a camera, a serial interface, one or more sensors, on or more motors, a light source, a turret, and a data interface. The controller can be configured to operate the microscope autonomously, to present image data on the display device, and to perform a focusing operation.

The method of performing the focusing operation can include setting operating parameters, capturing a low-magnification image, choosing focus point locations, moving to a selected focus point, analyzing the image to best determine a focus technique, determining the Z position search pattern, setting the initial focal plane, capturing the image, storing the image, calculating focus power, determining whether additional images at different focal planes are needed, determining whether to move to another focus point, selecting peak focus power, censoring focus points, and fitting a focal plane. Choosing focus points on a specimen can include performing a silhouette scan, determining the number of specimen pieces, eliminating locations near cover slip edges, determining the number of focus points to assign, collecting a list of candidate focus points, ranking the candidate list, selecting the first focus point, trimming the candidate list, creating a distance array, selecting the next focus point, determining if the points are collinear, jittering the focus points, determining if there are a sufficient number of focus points (e.g., at least four), and selecting any remaining focus points.

According to further implementations, a method can include obtaining an image of at least a portion of a scan region, analyzing the image to find an area in the image representing a sample, determining a nature of the sample at a selected focus point location that falls in the area in the image, selecting an automated focusing process for use at the selected focus point location, from among multiple automated focusing processes, based on the determined nature of the sample at the selected focus point location, and focusing the selected automated focusing process. The determining can include performing a cluster analysis of data from the area representing the sample in the image according to focusability. The selecting can include selecting multiple different automated focusing processes for use at multiple different selected focus point locations based on different tissue characteristics at the multiple different selected focus point locations.

The method can further include preparing a set of candidate focus points, and selecting from the candidate focus points to obtain the selected focus point locations such that the selected focus point locations are distributed across the area representing the sample. The preparing can include collecting the set of candidate focus points, and trimming the set based on specified criteria that sets an upper limit on focus point locations. The selecting from the candidate focus points can include maximizing distance between selected points. The maximizing can include maximizing the distance among a first set of selected focus points, and the selecting from the candidate focus points can further include minimizing a distance among a second set of selected focus points.

The selecting from the candidate focus points can include uttering a focus point to eliminate collinearity with previous focus points. The focusing can include using the different automated focusing processes at the different selected focus point locations, respectively, to obtain multiple Z-axis points, and the method can further include setting a focal surface according to the Z-axis points, and focusing at other locations according to the focal surface. The setting can include weighting the Z-axis points according to a confidence measure, and fitting the focal surface to the weighted Z-axis points. The method can further include removing one or more of the Z-axis points determined to be outliers before setting the focal surface.

The analyzing can include performing a silhouette scan. The obtaining can include taking a first digital image of a microscope slide with a lower-magnification microscope objective that has a large depth of view, the analyzing can include analyzing the first digital image to find the area representing the sample, and the determining can include acquiring a second digital image of the microscope slide at the selected focus point location with a higher-magnification microscope objective, and evaluating the second digital image with respect to available automated focusing processes. The available automated focusing processes can include focusing processes previously selected (e.g., by an application designer) based on an empirical analysis of focusing processes applied in a given test of a biological specimen.

According to further implementations, various methods of selecting a focusing technique can be effected in a system, apparatus or article including a machine-readable medium storing instructions operable to cause one or more machines to perform operations of the method. For example, an apparatus can include an interface configured to connect with a microscope, and a controller configured to send signals through the interface to operate the microscope and to perform operations including analyzing an image of at least a portion of a scan region to find an area in the image representing a sample, determining a nature of the sample at a selected focus point location that falls in the area in the image, selecting an automated focusing process for use at the selected focus point location, from among multiple automated focusing processes, based on the determined nature of the sample at the selected focus point location, and outputting a signal to cause focusing of the microscope using the selected automated focusing process. The interface can include a serial interface and a data interface, and the controller can be a special-purpose or conventional computer.

One or more of the following advantages may be provided. The present focusing methods and systems can take into account optimal positions on the X,Y plane at which to focus. A microscope, or other magnifying system, can avoid focusing on something other than the sample of interest (e.g., focusing on the glass slide itself) using the present systems and techniques. The best possible focus points can be chosen based on prior knowledge of the nature and/or the location of the sample. An optimal focal plane can be generated using a well selected distribution of focus points across the sample. Focal points can be distributed so as to generate an optimal focal plane across the entire sample of interest, and the focal plane (along the Z axis) that provides the best focus of the specimen can be determined.

The present systems and techniques can utilize multiple focus techniques across an entire slide. Depending on the nature of the sample, the stain or die used, or even the portion of the sample that falls within the microscope's field of view, different focus techniques may better determine the optimal focal plane(s). The present systems and techniques can determine which focus technique is best suited for each position on the X,Y plane on which the microscope is focused. Thus, different automated focusing processes (including commonly known focus techniques) can be used at different X,Y locations depending on the nature of the sample at each location, and multiple {X,Y,Z} coordinates obtained using the different automated focusing processes can be used to form a focal surface (e.g., a focal plane) to govern focusing at other X-Y locations on the sample.

Multiple {X,Y,Z} coordinates can be analyzed to determine whether any of the points are outliers, and such outliers can be removed from further consideration. Focus points that lie on the sample of interest can be identified, and confidence in the resulting focus plane can be improved. A particular focus technique best suited for determining the optimal focal plane at a given X,Y coordinate on a sample or samples can be selected and implemented. The Z position that provides the optimal focal point for a particular X,Y coordinate can be determined. Moreover, the resulting focus points can be analyzed, and those that are determined to be outliers can be filtered out.

Details of one or more embodiments are set forth in the accompanying drawings and the description below. Other features and advantages may be apparent from the description and drawings, and from the claims.

DRAWING DESCRIPTIONS

These and other aspects will now be described in detail with reference to the following drawings.

DETAILED DESCRIPTION

The systems and techniques described here relate to focusing in a computer-controlled microscope. A method can include selecting focus points distributed across a sample, or samples, while avoiding points that are collinear. The points can be chosen such that an optimal focal plane is established. A focus technique can be chosen, based on various parameters derived from a low-magnification image of that location. In this manner, a technique most suited for focusing on a particular sample or portion of sample can be used.

Figure 1:
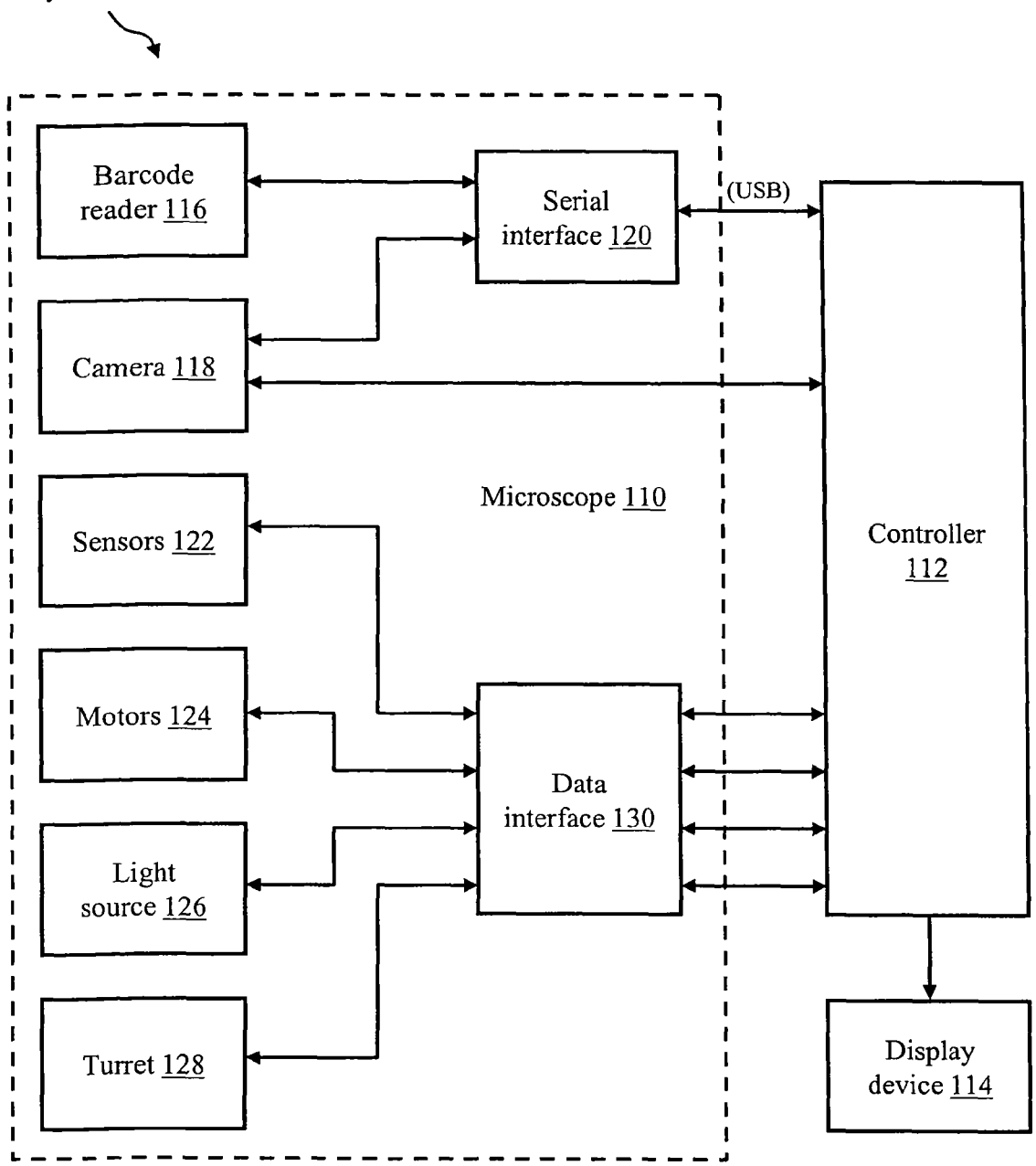
FIG. 1 is a block diagram showing a microscope imaging system, according to some implementations.

FIG. 1 illustrates a high-level functional diagram of a microscope imaging system 100. Microscope imaging system 100 is representative of a generalized imaging system suitable for use with the optimized focus techniques described in detail in connection with FIGS. 2 through 4. Microscope imaging system 100 includes a microscope 110 that is electrically connected to a controller 112 that has a display device 114. Controller 112 is representative of any special-purpose or conventional computer, such as a desktop, laptop, or host computer. Controller 112 can be loaded with the appropriate software for controlling microscope imaging system 100, such as software for running image-processing techniques and image analysis techniques. Display device 114 can be any special-purpose or conventional display device (e.g., a computer monitor) that outputs graphical images to a user.

Microscope 110 is a computer-controlled microscope suitable for use in an automated imaging system. An example of microscope 110 is a ChromaVision Automated Cellular Imaging System (ACIS). Microscope 110 can further include a barcode reader 116, a camera 118, a serial interface 120, one or more sensors 122, one or more motors 124, a light source 126, a turret 128, and a data interface 130.

Barcode reader 116 is a standard barcode reader capable of detecting an identifier upon, in the example of microscope imaging system 100, a standard microscope slide (not shown). Camera 118 is a digital camera that has selectable resolution capabilities. Camera 118 is mounted upon turret 128 of microscope 110, such that its aperture is aligned with the field of view (FOV) of any lens associated with turret 128. Barcode reader 116 and camera 118 can feed electrical inputs of serial interface 120, which facilitates a serial communication link between these elements and controller 112. For example, serial interface 120 can provide a USB connection to controller 112. Furthermore, camera 118 can provide a direct video output connect to a video card (not shown) within controller 112 that gathers the image data from camera 118 for processing.

Sensors 122 include, but are not limited to, position sensors, temperature sensors, and light intensity sensors or optical encoders. Motors 124 can be conventional servomotors associated with the motion control of microscope 110, such as for rotating the appropriately powered lens within the optical path of microscope 110, for adjusting focus, or for controlling an automated microscope stage (not shown). Light source 126 can be any suitable light source for appropriately illuminating the FOV of microscope 110, such that the creation of a digital image of that FOV is possible. Turret 128 can be a conventional motor-driven microscope turret, upon which is mounted a set of lenses of varying power that may be rotated into the optical path of microscope 110. Turret 128 is also suitably controlled to provide the desired focus. Sensors 122, motors 124, light source 126, and turret 128 can feed electrical inputs of data interface 130. Data interface 130 can be a conventional system driver card, which facilitates a data communication link between these elements and a motion control card (not shown) within controller 112.

Although specific functions of microscope imaging system 100 are further described in reference to FIGS. 2 through 4, the generalized operation of microscope imaging system 100 is described in reference to FIG. 1, as follows. A continuous supply of standard microscope slides that have a biological sample deposited thereon is fed to the automated microscope stage of microscope 110 via an in-feed stage and, subsequently, is positioned in the FOV of microscope 110. Additionally, during the transition from the in-feed stage of microscope imaging system 100 to the microscope stage of microscope 110, the identifier (ID) of the target microscope slide is read by barcode reader 116. The target slide is subsequently scanned at various resolutions and magnifications, based on image-processing techniques and image analysis techniques executed by controller 112. Upon completion of the image scan operation, the slide is transferred out of microscope imaging system 100 via an out-feed stage (not shown), the slide ID and image data for that particular slide is transmitted to controller 112 and stored in memory, and the motion control system moves the next target slide into the FOV of microscope 110.

This process automatically repeats for each microscope slide that is automatically fed into microscope imaging system 100. It is noted that microscope imaging system 100 operates autonomously, i.e., a clinician can initiate microscope imaging system 100 and microscope imaging system 100 can subsequently operate automatically without human intervention, so long as a supply of microscope slides is available at its in-feed stage and no system errors occur. At any time, however, a clinician may view and/or manipulate the digital image of any given slide via controller 112 and display device 114 for the inspection and analysis of any given specimen, as is well known in anatomic pathology. This is possible because controller 112 can reconstruct the image by using the image data associated with the contiguous FOVs and the image registration information.

Figure 2A:
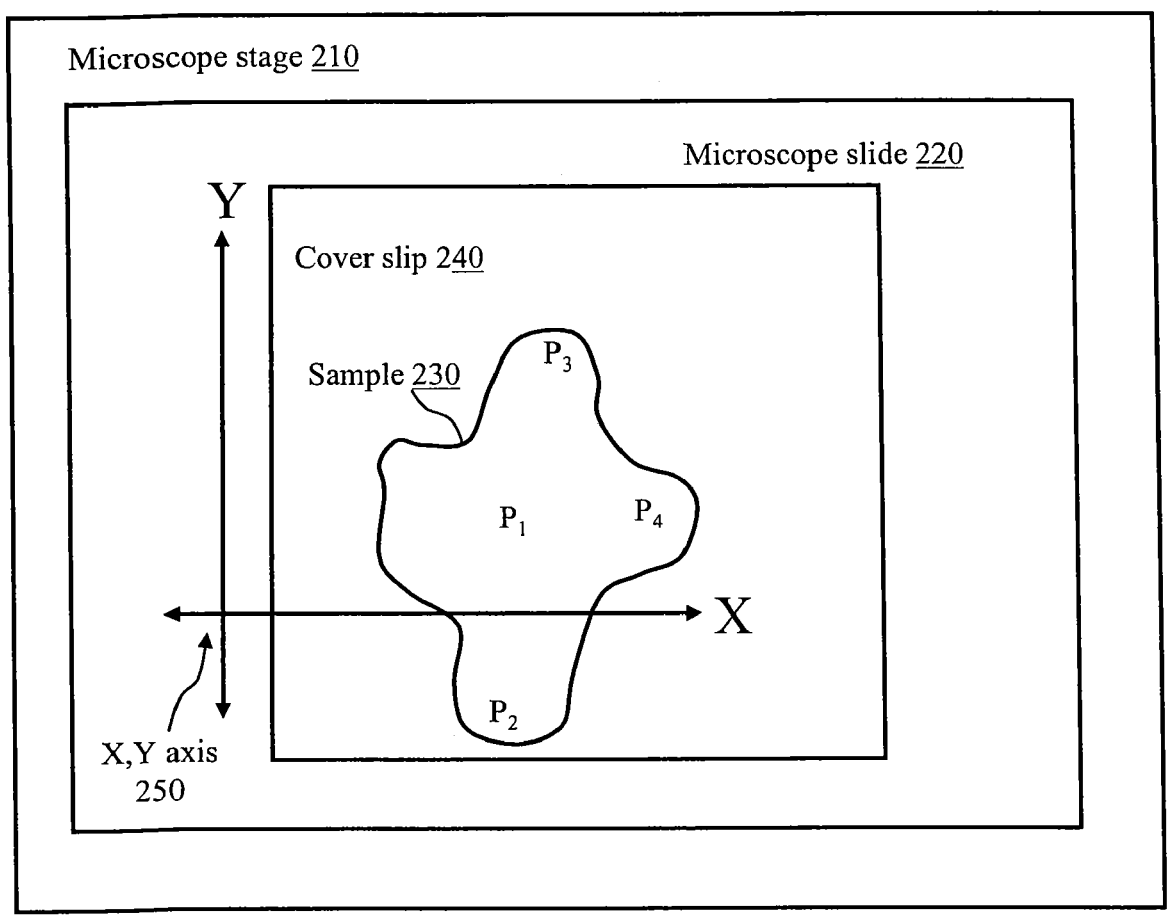
FIG. 2A is a top view of a microscope stage assembly of a microscope imaging system, according to some implementations.

FIG. 2A illustrates a top view of microscope stage assembly 200 of the microscope imaging system 100. Securely resting upon a microscope stage 210 is a conventional microscope slide 220, which is formed of a substrate, such as glass, for example. The microscope slide 220 contains a specimen to be viewed, such as a sample 230. Sample 230 is representative of any target specimen, such as a tissue sample resulting from a needle biopsy. A cover slip 240 may be resting on top of sample 230 to protect it or to secure it to slide 220. Microscope slide 220 may be moved in either direction along an X,Y axis 250 in order to provide a view of different portions of sample 230 through microscope 110. Focus points P1, P2, P3, and P4 are representative of locations which microscope imaging system 100 may determine are ideal points on which to focus.

Figure 2B:
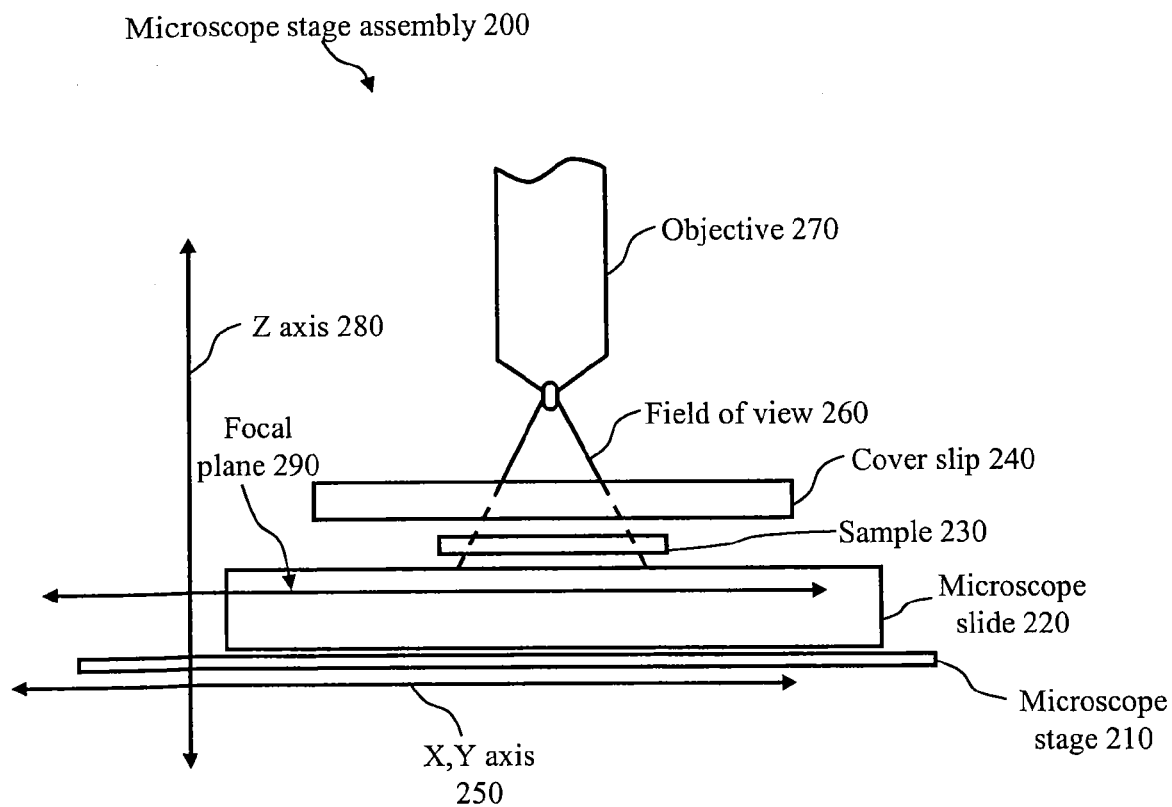
FIG. 2B is a side view of a microscope stage assembly, according to some implementations.

FIG. 2B illustrates a side view of microscope stage assembly 200, with sample 230 on microscope slide 220 in a field of view 260 of an objective 270 for viewing specimens. Microscope stage 210 or objective 270 are moved relative to each other, in order to adjust the position of a focal plane 290 along a Z axis 280. In one configuration, objective 270 of microscope imaging system 100 can move either forward or backward along Z axis 280, and sample 230 is in a fixed position. In an alternative embodiment, sample 230 is movable along Z axis 280, and the position of objective 220 is fixed.

Figure 3:
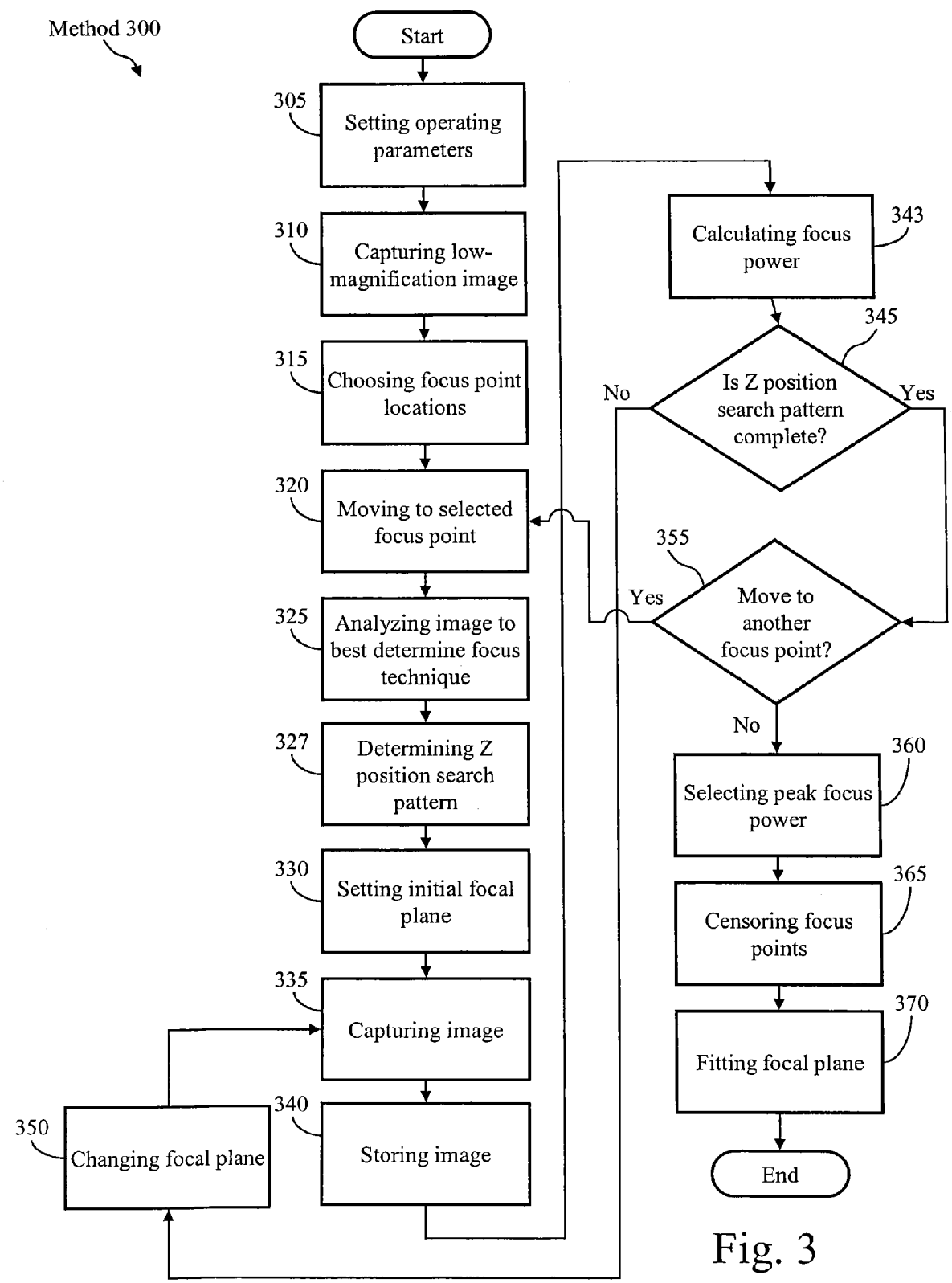
FIG. 3 is a flow diagram of a method of establishing the optimal focal plane of a specimen on a microscope slide, according to some implementations.

FIG. 3 illustrates a flow diagram of a method 300 of focusing a microscope imaging system on a specimen. At 305, operating parameters can be set. Microscope imaging system 100 can set operating parameters that can then be used to enhance the operation of subsequent operations and improve the confidence of the resulting focal plane 290. Operating parameters can include functions, constants or inputs, which can be derived from rules-of-thumb that are based upon prior knowledge and attributes of the microscope slide 220, cover slip 240, or sample 230. For example, parameters may include the expected specimen color, size, features, or distribution, and may also be related to the test being run. Parameters may also include microscope slide 220, cover slip 240, or sample 230 thickness. Operating parameters can be derived by associating prior knowledge already stored within microscope imaging system 100 with a unique identifier on microscope slide 220, such as a barcode. In addition, a user may manually enter additional information or parameters directly, via a graphical user interface designed for accepting operating parameters to microscope imaging system 100.

At 310, a low-magnification image can be captured. Microscope imaging system 100 can take a digital image of the entire microscope slide 220 with a low-magnification microscope objective 270 that has a large depth of view (DOV). The image can be stored in the memory of microscope imaging system 100. At 315, focus point locations can be chosen. Microscope imaging system 100 can analyze the image captured at 310 and choose focus points, P1 through Pn, on sample 230 that are judged to be optimal locations in which to focus for creation of a focal plane. Further details of how these points can be chosen are described below in connection with FIG. 4.

At 320, the system can move to a selected focus point. Controller 112 can move microscope slide 220 to a focus point, such as P1, from a candidate list of focus points determined at 315. Focus points can be selected from a candidate list in the order of a ranking determined for the focus points of the list. The selected focus point is located in field of view 260.

At 325, an image can be analyzed to best determine the focus technique for a selected focus point. Microscope imaging system 100 can evaluate the image that contains the selected focus point (or acquire and evaluate a higher power image of the focus point at a best guess focus) and determine which focus technique to use to best determine the optimal focal plane 290 for the selected focus point. A focus technique is a process of analyzing a digital image taken of a particular focus point with focal plane 290 located at a particular point along Z axis 280 and determining how in focus the image is. A focus technique generates a measure or measures of focal power.

There are many focus techniques that can be used, but in general, an empirical analysis can be used to associate specific focus techniques with specific types of focus points likely to be found in a given test of a biological specimen. A designer of an imaging and analysis application, which can be implemented in the system 100, can choose appropriate focus techniques (for various types of focus points) based on a study of many samples. The best focus technique for a point on a sample may vary significantly with the type of tissue and its preparation, such as the nature of any stain(s) used. The system 100 can select from among the specified focus techniques based on the nature of the sample 230 at various selected X-Y focus points.

The nature of the sample at various focus points can be determined based on image properties and information known about the type of sample being examined. The nature of the sample at various focus points can be determined using a cluster analysis performed across one or more parameters, including potentially derived parameters of zelles defined within an image. For example, the present systems and techniques can employ the clustering systems and techniques described in U.S. patent application Ser. No. 11/343,544, filed Jan. 30, 2006, and entitled, System for and Method of Intelligently Directed Segmentation Analysis for Automated Microscope Systems, which is hereby incorporated by reference. Thus, a cluster analysis according to focus-ability can be performed to find clusters associated with specific focus techniques giving good results (or potentially cluster(s) that indicate no focusing should be performed at such locations).

In general, image analysis can be performed at 325 to determine which focusing method to use at that location. This image analysis can look for features of the sample in the image (e.g., edginess) that correspond to the manner in which the focusing technique works (e.g., a focusing method that looks for sharp edges). Many features, including color, size, features or distribution, can be used. For example, the image can have three color plains (e.g., red, blue, green), and the system can perform a Fast Fourier Transform (FFT) on each respective color plane to find the one with more power, which color plane can then be used for later Z-axis focusing. Other examples include, (1) doing a two dimensional FFT on the image (e.g., on a portion of the original low power image or a higher power image acquired for analysis) to determine in which direction the sample has significant frequency components at the location, and thus to determine in which direction to perform one dimensional FFT during the Z-axis focusing; or (2) looking at the total amount of high frequency components in the image to determine whether to perform an FFT-based focusing method (suitable even without significant high frequency components) or a Laplacian-based focusing method (suitable when significant high frequency components are present).

In some embodiments, the microscope imaging system 100 determines a focus technique for each focus point. In other embodiments, microscope imaging system 100 selects only those focus points that meet the specific criteria of a selected focus technique.

At 327, a Z position search pattern can be determined. Microscope imaging system 100 can determine the initial position on Z axis 280 for focal plane 290, as well as subsequent positions along Z axis 280 for focal plane 290 above and below the initial position, from which to capture digital images. This determination can be based on a selected focus technique, the type of specimen being analyzed, the type of slide, other test related factors, or a combination of these.

At 330, an initial focal plane can be set. For the focus point moved to at 320, the distance between objective 220 and sample 230 is varied, relative to each other, in order to adjust the position of focal plane 290 to an initial specified location along Z axis 280. At 335, an image is captured. Microscope imaging system 100 can capture a high-resolution digital image by using focal plane 290 at a specified location along the Z axis 280. At 340, the image can be stored. The high-resolution image can be saved, for future viewing, in the memory of microscope imaging system 100.

At 343, focus power can be calculated. Microscope imaging system 100 can analyze the digital image captured at 335 and, according to the focus technique chosen at 325, calculate a focus power, which is a quantitative measure of focusness. This focus power can be stored in the memory of microscope imaging system 100 and associated with the image it was derived from.

At 345, a determination is made as to whether the Z position search pattern is complete. Microscope imaging system 100 can determine whether the search pattern established at 327 is complete. If the search pattern is not complete, another image is obtained after locating focal plane 290 at a different position along Z axis 280, as determined at 327. At 350, the focal plane is changed. Controller 112 can change the distance between objective 220 and sample 230, relative to each other, in order to adjust the position of focal plane 290 to a newly specified location along Z axis 280. The position of focal plane 290 along Z axis 280 is different from the position of focal plane 290 in previous digital images for the specific focus point and as specified at 327. The next image is then captured at 335.

Once the search pattern is complete, a determination is made at 355 as to whether to move to another focus point. Microscope imaging system 100 can determine if there are any remaining focus points, as determined at 315, to be focused on. If so, the next focus point, such as P2, is selected and the method 300 proceeds to 320. If not, the process 300 proceeds to 360.

At 360, peak focus power can be selected. Using the specific focus technique determined at 325 for a given focus point, microscope imaging system 100 can determine the peak focus power. The focus technique analyzes each high-resolution image captured at the focus point and returns a measure of focusness. Each high-resolution image corresponds to a specific focal plane 290 along Z axis 280. The relationship between the position of focal plane 290 along Z axis 280 and the corresponding measure of focusness represents the power signature for the specified focus point. Microscope imaging system 100 can determine the optimal focal plane 290 from several parameters, including the shape of the power signature, including the slope, the position on Z axis 280 of focal plane 290, and the ratio of various points along the power signature.

At 365, focus points can be censored. Microscope imaging system 100 can analyze the focus points and resulting focal planes 290 from a quality assurance perspective to remove any focus points that are determined to be outliers. Outliers are focus points whose focal plane 290 is determined by microscope imaging system 100 not to be plausible, relative to the other focus points, or is not focused on a specimen. In one embodiment, outliers are removed, and focal plane 290 is made up of the remaining focus points. In an alternative embodiment, outliers are removed and substitute focus points in the general proximity of the removed focus points are found. To define a unique focal plane 290, at least three non-linear focus points are required. Therefore, outliers can be removed only when four or more focus points exist. In some embodiments, microscope imaging system 100 can compare statistics between subsets of focus points—each subset has one focus point removed. If a subset's statistics vary significantly from the others, that subset contains an outlier.

At 370, a focal plane can be fit to the remaining focus points. In some embodiments, microscope imaging system 100 can fit a plane to the {X,Y,Z} coordinates associated with each focus point. In other embodiments, microscope imaging system 100 can take an average of the {X,Y,Z} coordinates associated with each focus point, in order to fit a plane. In further embodiments, microscope imaging system 100 can identify outliers and filter out the {X,Y,Z} coordinates, in order to fit a focus plane, or apply weights to the {X,Y,Z} coordinate used in the fitting based on a ranking of the focus points according to a confidence measure (e.g., a percentage confidence in the focus point, such as a ratio of peak power signature to average power signature for the focus point).

In still further embodiments, microscope imaging system 100 can fit one or more higher-order functions to the {X,Y,Z} coordinates, in order to fit a focal surface. Such higher-order functions can be used at high magnifications. Moreover, the function fitting can fit many focal planes, surfaces, or both to the coordinates, such as by fitting a mesh of triangles to the coordinates.

Figure 4:
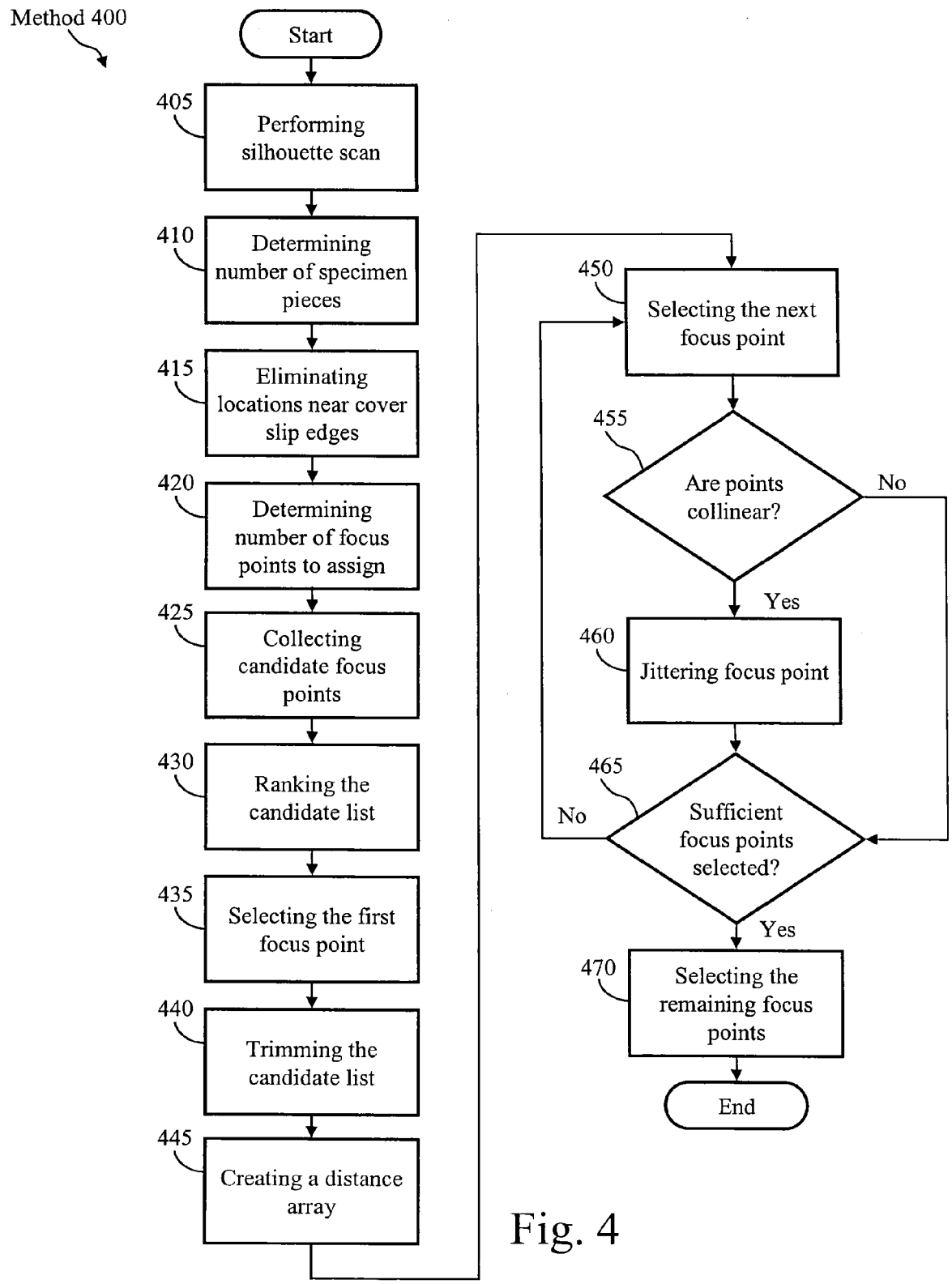
FIG. 4 shows a flow diagram of a method of focusing a microscope imaging system on a specimen, according to some implementations.

FIG. 4 illustrates a flow diagram of a method 400 for choosing focus points on a specimen. At 405, a silhouette scan can be performed. Microscope imaging system 100 can differentiate "interesting" vs. "non-interesting" areas, or zelles and minor zelles, in a high-resolution, low-magnification image. Microscope slide 220 can be partitioned into an array of contiguous segments, or zelles, that cover the entire area. The area of each zelle can be defined by the power (i.e., magnification) setting of microscope 110 or by the nature of the test being run. The X,Y coordinates of each zelle can be captured and stored in the memory of microscope imaging system 100. Those skilled in the art will appreciate that a microscopic FOV substantially reduces as the magnification increases. The "interesting" zelles are those that have a higher probability of containing sample 230. These zelles have a statistic or parameter that has exceeded a specified threshold. Many statistics or parameters can be collected on interesting zelles. Such statistics or parameters may include edginess, strength, number of on/off pixels, variation/standard deviation of power of the pixel values, or number of pixels that are not white. Further details of this operation are explained in U.S. patent application Ser. No. 10/413,493 (U.S. Pub. No. 2004-0202357 A1), filed Apr. 11, 2003, and entitled, Silhouette Image Acquisition, which is hereby incorporated by reference.

At 410, the number of specimen pieces in the sample can be determined. Microscope imaging system 100 can analyze the interesting zelles and determine the number of specimen pieces located on microscope slide 220 by using the X,Y coordinates for each zelle. For example, as shown in FIG. 1, a single specimen piece is depicted as sample 230. However, other examples may include multiple pieces of specimen spread out across microscope slide 220.

At 415, locations near cover slip edges can be eliminated. In order to avoid focus points on the edge of cover slip 240, microscope imaging system 100 can clip those portions of sample 230 close to the edge of cover slip 240 and need not select those areas as focus points. At 420, the number of focus points to assign can be determined. If there is a single specimen piece, such as sample 230, all the focus points are assigned within this piece. However, if more than one specimen piece is found on microscope slide 220, then focus points can be assigned to pieces in proportion to their area. In this manner, the largest specimen pieces can be assigned the most focus points. The total number of focus points can be entered by the user at 305 in FIG. 3. In alternative embodiment(s), the total number of focus points can be a function of the size of the specimen, with microscope imaging system 100 assigning a specified number of focus points per unit of area.

At 425, candidate focus points can be collected. Microscope imaging system 100 can consider as likely focus points all minor zelles that exceed a given threshold. If there are too many minor zelles that exceed the given threshold, which may bias distribution of focus points to the same proximity, focus points can be selected at a lower resolution, such as the primary zelle level. In general, the initial candidate focus points can be selected to maximize distribution of the focus points and to increase the chances of finding good places to focus. For example, a regular grid of locations can be superimposed on each specimen piece, and the candidate focus points can include points in proximity to each of the grid locations that also exceed a threshold in one or more features, such as described above, used in focusing.

At 430, the candidate list can be ranked. Microscope imaging system 100 can rank each candidate focus point. Based on the statistics or parameters assigned to each zelle or minor zelle at 405, those focus points with the highest score can be ranked highest. The ranking can be based on the data at each respective focus point (e.g., the one or more features described above) and also on the location of each focus point with respect to the sample (e.g., a candidate focus point in the center of each identified specimen piece can be assigned a higher rank than peripheral focus points). The rank information for the focus points can be used later in trimming the candidate list or in applying weights to the focus points for use in fitting a focal plane.

At 435, the first focus point is selected. Microscope imaging system 100 can select as the first focus point the zelle or minor zelle ranked first, which is that with the highest score. In some embodiments, the first selected focus point for each identified specimen piece can be a point in the center of the specimen piece.

At 440, the candidate list can be trimmed. Microscope imaging system 100 can reduce the list of candidate focus points based on specified criteria. The specified criteria can set both a lower limit and an upper limit for the number of focus points, which can be based on predefined processing settings, user input, or both. For example, if the candidate list of focus points includes more than a predefined number (e.g., five) times the number specified in at 410, a statistic or parameter threshold (e.g., one previously provided by a user or application designer) can be used to eliminate those focus points that fail to exceed the threshold. An example statistic or parameter threshold can be a percentage confidence in the focus point (e.g., as defined by the variance in power at the focus point divided by the average variance in power for all candidate focus points).

Moreover, any rankings established at 430 can be used to trim focus point candidates from the list. For example, each focus point can have a ranking based on a characteristic of the focus point and the focus technique used at that point (e.g., a measure of edginess for points to be focused on using an edge detection focus technique). Focus points lower in the ranking can be trimmed as needed to reduce the candidate list. In general, reducing the candidate list can significantly reduce subsequent time and processing requirements when calculating the distances between the points in the candidate list.

At 445, a distance array can be created. Microscope imaging system 100 can calculate the vector distance between each focus point. The distances can be stored in the memory of microscope imaging system 100. At 450, the next focus point can be selected. Microscope imaging system 100 can select as the next focus point the point with the greatest distance from all previously selected focus points. If there is only one previously selected focus point, the next focus point can be that which has the greatest vector distance from the previously selected focus point. If there are two previously selected focus points, the next focus point can be that which has the greatest sum of distances between it and the two previously selected focus points, and so on. For example, if microscope imaging system 100 previously selected focus points P1 and P2, as described in more detail in FIG. 2A, the system can compare the sum of distances (P1P3+P2P3) to (P1P4+P2P4) and choose P3 as the next focus point. Moreover, if the candidate list is depleted, additional candidate focus points can be obtained from those trimmed at 440.

At 455, a check is made as to whether the points are collinear. A unique plane can be defined by any three non-linear points. Three points that are collinear define a unique line, but an infinite number of planes. Therefore, microscope imaging system 100 can check the selected focus point against all previously selected focus points for collinearity along either the X axis or Y axis. If microscope imaging system 100 determines the focus point is collinear with any previously selected focus points, then method 400 proceeds to 460. If not, method 400 proceeds to 465.

At 460, the focus point can be jittered. Microscope imaging system 100 can jitter a collinear focus point to a new location. The jitter can be limited to a safe distance from the original location within which specimen is known to exist. The jitter can be in a random direction, or the jitter can be in the direction of the strength of the information content, where strength can be a statistic or parameter for each interesting zelle, as determined at 405.

At 465, a check can be made as to whether a sufficient number of focus points (e.g., at least four) have been selected. Microscope imaging system 100 can determine how many focus points have been selected so far in method 400. The system can select a first set of focus points (e.g., the first four focus points) by using one technique and can select subsequent focus points by following an alternative technique. If a sufficient number of focus points (e.g., at least four) have been selected, method 400 proceeds to 470. If not, method 400 proceeds to 450.

At 470, any remaining focus points can be selected. If there still remain focus points to assign, as specified at 420, microscope imaging system 100 can select from the candidate focus points determined at 440 those that minimize the distance between all previously selected focus points. In effect, the same comparison can be made as at 450, but instead of choosing the focus point with the greatest distance to all the existing focus points, microscope imaging system 100 can now select the focus point with the minimum distance to all the existing focus points. After selecting each subsequent focus point, microscope imaging system 100 can check the point against all previously selected focus points for collinearity along either the X axis or Y axis. If microscope imaging system 100 determines that the focus point is collinear with any previously selected focus points, the system can jitter the focus point, as described above.

The processes described above, and all of the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown only for the purpose of clarity in this description. No particular order may be required for these operations to achieve desirable results, and various operations can occur simultaneously. For example, the logic flows depicted in FIGS. 3 and 4 do not require the particular order shown, sequential order, or that all operations illustrated be performed, to achieve desirable results. In certain implementations, multitasking and parallel processing may be preferable.

The various implementations described above have been presented by way of example only, and not limitation. Thus, the principles, elements and features described may be employed in varied and numerous implementations, and various modifications may be made to the described embodiments without departing from the spirit and scope of the invention. Accordingly, other embodiments are within the scope of the following claims.

What is claimed is:

1. A method comprising:
    analyzing, by a controller via operation of at least one processor to execute at least one program instruction stored on a machine-readable medium, an image of at least a portion of a scan region to find an area in the image representing a sample;
    preparing, by the controller, a set of candidate focus points;
    selecting, by the controller, from the candidate focus points to obtain multiple different selected focus point locations such that the selected focus point locations are distributed across the area representing the sample, wherein the selecting, by the controller, from the candidate focus points comprises uttering a focus point to eliminate collinearity with previous focus points;
    determining, by the controller, a nature of the sample at each selected focus point location that falls in the area in the image;
    selecting, by the controller, an automated focusing process for use at each selected focus point location, from among multiple different automated focusing processes, based on the determined nature of the sample at each selected focus point location; and
    focusing, by operation of the controller, a computer-controlled microscope communicatively coupled to the controller using the selected automated focusing process at each selected focus point location.

2. The method of claim 1, wherein the determining, by the controller, a nature of the sample at a selected focus point location that falls in the area in the image comprises performing a cluster analysis of data from the area representing the sample in the image according to focus-ability.

3. The method of claim 1, wherein the preparing, by the controller, a set of candidate focus points comprises collecting the set of candidate focus points, and trimming the set based on specified numerical or statistical criteria that sets an upper limit on focus point locations.

4. The method of claim 1, wherein the selecting, by the controller, from the candidate focus points comprises maximizing, by the controller, at least one distance between selected points.

5. The method of claim 4, wherein the maximizing, by the controller, the at least one distance comprises maximizing the distance among a first set of selected focus points, and the selecting from the candidate focus points further comprises minimizing a distance among a second set of selected focus points.

6. The method of claim 1, wherein the focusing, by operation of the controller, the computer-controlled microscope comprises using the different automated focusing processes at the different selected focus point locations, respectively, to obtain multiple Z-axis points, the method further comprising:
    setting, by the controller, a focal surface according to the Z-axis points; and
    focusing by operation of the controller, the computer-controlled microscope, at other locations according to the focal surface.

7. The method of claim 6, wherein the setting comprises:
    weighting, by the controller, the Z-axis points according to a confidence measure; and
    fitting, by the controller, the focal surface to the weighted Z-axis points.

8. The method of claim 6, further comprising removing, by the controller, one or more of the Z-axis points determined to be outliers before setting, by the controller, the focal surface.

9. The method of claim 1, wherein the analyzing, by the controller, an image of at least a portion of a scan region comprises performing a silhouette scan.

10. The method of claim 1, further comprising obtaining, using the computer-controlled microscope, the image by taking a first digital image of a microscope slide with a lower-magnification microscope objective that has a large depth of view, wherein the analyzing, by the controller, an image of at least a portion of a scan region comprises analyzing the first digital image to find the area representing the sample, and wherein the determining comprises:
    acquiring, by operation of the controller to control the computer-controlled microscope, a second digital image of the microscope slide at the selected focus point location with a higher-magnification microscope objective; and
    evaluating, by the controller, the second digital image with respect to available automated focusing processes.

11. The method of claim 10, wherein the evaluating, by the controller, the second digital image with respect to available automated focusing processes comprises evaluating, by the controller, focusing processes previously selected based on at least one empirical analysis of focusing processes applied in a given test of at least one biological specimen.

12. An automated imaging system comprising:
    a microscope;
    a controller coupled with the microscope; and
    a display device coupled with the controller;
    wherein the controller is programmed with an algorithm for operating the microscope autonomously, to present image data on the display device, and to perform operations including:

analyzing, by the controller, an image of at least a portion of a scan region to find an area in the image representing a sample;

preparing a set of candidate focus points;

selecting from the candidate focus points to obtain multiple different selected focus point locations such that the selected focus point locations are distributed across the area representing the sample, wherein the selecting, by the controller, from the candidate focus points comprises jittering a focus point to eliminate collinearity with previous focus points;

determining a nature of the sample at each selected focus point location that falls in the area in the image;

selecting an automated focusing process for use at each selected focus point location, from among multiple different automated focusing processes, based on the determined nature of the sample at each selected focus point location; and focusing the microscope, by operation of the controller, using the selected automated focusing process at each selected focus point location.

13. The system of claim 12, wherein the determining comprises performing a cluster analysis of data from the area representing the sample in the image according to focusability.

14. The system of claim 12, wherein the selecting comprises selecting multiple different automated focusing processes for use at multiple different selected focus point locations based on different tissue characteristics at the multiple different selected focus point locations.

15. The system of claim 12, wherein the preparing comprises collecting the set of candidate focus points, and trimming the set based on specified numerical or statistical criteria that sets an upper limit on focus point locations.

16. The system of claim 12, wherein the selecting from the candidate focus points comprises maximizing distance between selected points.

17. The system of claim 14, wherein the focusing comprises using the different automated focusing processes at the different selected focus point locations, respectively, to obtain multiple Z-axis points, and the operations further include:

setting a focal surface according to the Z-axis points; and
focusing at other locations according to the focal surface.

18. The system of claim 17, wherein the setting comprises:
weighting the Z-axis points according to a confidence measure; and
fitting the focal surface to the weighted Z-axis points.

19. The system of claim 17, the operations further including removing one or more of the Z-axis points determined to be outliers before setting the focal surface.

20. The system of claim 18, the operations further comprising obtaining the image by taking a first digital image of a microscope slide with a lower-magnification microscope objective that has a large depth of view, wherein the analyzing comprises analyzing the first digital image to find the area representing the sample, and the determining comprises:

acquiring a second digital image of the microscope slide at the selected focus point location with a higher-magnification microscope objective; and
evaluating the second digital image with respect to available automated focusing processes.

21. The system of claim 12, wherein the available automated focusing processes comprise focusing processes previously selected by an application designer based on an empirical analysis of focusing processes applied in a given test of a biological specimen.

* * * * *

UNITED STATES PATENT AND TRADEMARK OFFICE
CERTIFICATE OF CORRECTION

| | | |
|---|---|---|
| PATENT NO. | : 8,000,511 B2 | Page 1 of 1 |
| APPLICATION NO. | : 12/763854 | |
| DATED | : August 16, 2011 | |
| INVENTOR(S) | : Cynthia B. Perz | |

It is certified that error appears in the above-identified patent and that said Letters Patent is hereby corrected as shown below:

Column 3, line 62, delete "uttering" and insert --jittering--;
Column 13, line 51, delete "uttering" and insert --jittering--.

Signed and Sealed this
Sixth Day of December, 2011

David J. Kappos
*Director of the United States Patent and Trademark Office*